US009005391B2

(12) United States Patent
Hazen

(10) Patent No.: US 9,005,391 B2
(45) Date of Patent: Apr. 14, 2015

(54) METHOD AND APPARATUS FOR TRANSFER LAMINATION

(75) Inventor: John Hazen, South Hadley, MA (US)

(73) Assignee: Hazen Paper Company, Holyoke, MA (US)

(*) Notice: Subject to any disclaimer, the term of this patent is extended or adjusted under 35 U.S.C. 154(b) by 430 days.

(21) Appl. No.: 12/813,069

(22) Filed: Jun. 10, 2010

(65) Prior Publication Data

US 2010/0314036 A1 Dec. 16, 2010

Related U.S. Application Data

(60) Provisional application No. 61/186,531, filed on Jun. 12, 2009.

(51) Int. Cl.

| | |
|---|---|
| ***B29C 65/02*** | (2006.01) |
| ***B32B 37/06*** | (2006.01) |
| ***B32B 37/14*** | (2006.01) |
| ***B32B 37/26*** | (2006.01) |
| ***B44C 1/17*** | (2006.01) |
| *B32B 38/06* | (2006.01) |
| *B32B 38/10* | (2006.01) |

(52) U.S. Cl.
CPC .......................................... *B44C 1/17* (2013.01)

(58) Field of Classification Search
CPC .. B32B 37/26; B32B 2037/268; B32B 27/00; B29C 65/02; B29C 66/0044; B29C 65/18; B44C 1/1729; B44C 1/14; H05K 3/025; H05K 3/20; H05K 3/046
USPC .......................... 156/230, 233, 247, 249, 289
See application file for complete search history.

(56) References Cited

U.S. PATENT DOCUMENTS

| | | | | |
|---|---|---|---|---|
| 3,647,485 A * | 3/1972 | Seiferth et al. | 426/127 |
| 4,231,830 A * | 11/1980 | Ryan et al. | 156/232 |
| 4,275,106 A * | 6/1981 | Watanabe | 428/200 |
| 4,758,296 A * | 7/1988 | McGrew | 156/231 |
| 4,906,315 A * | 3/1990 | McGrew | 156/231 |
| 5,037,668 A * | 8/1991 | Nagy | 427/505 |
| 5,360,501 A | 11/1994 | Bolt | |
| 5,744,219 A * | 4/1998 | Tahara | 428/32.79 |
| 5,807,456 A * | 9/1998 | Kaule | 156/230 |
| 5,948,199 A * | 9/1999 | McGrew | 156/231 |
| 6,071,621 A * | 6/2000 | Falaas et al. | 428/425.8 |
| 6,264,782 B1 | 7/2001 | Oshima et al. | |
| 6,364,983 B1 * | 4/2002 | Kay | 156/230 |
| 6,641,921 B2 * | 11/2003 | Falaas et al. | 428/425.8 |
| 6,991,259 B2 * | 1/2006 | Schwarzbauer et al. | 283/62 |

(Continued)

FOREIGN PATENT DOCUMENTS

| | | |
|---|---|---|
| GB | 2457727 | 8/2009 |
| GB | 2457727 A * | 8/2009 |

*Primary Examiner* — Sonya Mazumdar
(74) *Attorney, Agent, or Firm* — McCormick, Paulding & Huber LLP

(57) ABSTRACT

An embodiment of the inventive method of transfer lamination bonding a first metallized side of a film to a substrate. Then a breakaway coating is applied to a second, non-metallized side of the film after the first metallized side has been bonded to the substrate. The bonded film and substrate are then placed in an oven. The film is then stripped from the substrate leaving metal from the film deposited on the substrate. The application of the breakaway coating is performed as an inline part of the transfer lamination process thereby providing an ease of manufacture presently unknown.

21 Claims, 3 Drawing Sheets

(56) References Cited

U.S. PATENT DOCUMENTS

| | | | | |
|---|---|---|---|---|
| RE39,044 | E | 3/2006 | Ross | |
| 2002/0000718 | A1 * | 1/2002 | Schwarzbauer et al. | 283/62 |
| 2004/0091681 | A1 * | 5/2004 | Hoffmann | 428/195.1 |
| 2004/0144479 | A1 * | 7/2004 | Cueli | 156/230 |
| 2008/0143926 | A1 | 6/2008 | Amimori et al. | |
| 2008/0316556 | A1 | 12/2008 | Eto et al. | |
| 2010/0044078 | A1 * | 2/2010 | Narahashi et al. | 174/250 |

* cited by examiner

METHOD AND APPARATUS FOR TRANSFER LAMINATION

CROSS REFERENCE TO RELATED APPLICATIONS

This application claims the benefit of U.S. Provisional Application Ser. No. 61/186,531, filed on Jun. 12, 2009, herein incorporated by reference in its entirety.

FIELD OF THE INVENTION

The present invention relates generally to a method and apparatus for transfer lamination and more specifically to a method and apparatus in which a transfer film is coated for a subsequent use during a transfer lamination process.

BACKGROUND OF THE INVENTION

Transfer lamination is a process by which a layer of material is applied to a substrate. Applied materials can include metals, such as, for example, a hologram.

Generally, transfer lamination involves bonding a transfer film having a application layer, e.g., a metallized layer such as a hologram, to a paper substrate, stripping the film from the substrate leaving the application layer, and then applying a coating to the layer to facilitate printing. As will be appreciated, this process typically involves multiple, separate steps.

In particular, the transfer film is coated in an initial step with a breakaway layer that allows the film to be stripped from the substrate while leaving the application layer and the breakaway layer on the substrate. After the film is coated, the application layer is applied, e.g., the film is metallized. Once the film has been metallized, an adhesive is applied and the film is then bonded to the substrate and the film/substrate is cured typically in an oven. Once removed from the oven, the film is stripped away and the substrate is coated and placed again in the oven to complete the process.

A drawback to this method is that the breakaway layer is applied to the transfer film in a step separate from the transfer lamination process. As will be apparent, each manufacturing step has associated costs and it is generally desirable to reduce such costs through a simplified process with as few manufacturing steps as reasonably necessary.

Moreover, the film used in the transfer of the application layer is typically discarded, or reused only a limited number of times, after it is stripped from the substrate due to the costs of reuse/recycling.

Used transfer film also presents disposal and recycling problems as such films are generally manufactured from polyesters such as polyethylene terephthalate, ("PET"), which are not easily recycled/remanufactured. In particular, plastic films are difficult to remanufacture in that individual characteristics of potentially remanufactured products vary considerably. Likewise, the variety of extruded resins in such films pose significant recycling challenges.

These challenges are evidenced by the fact that presently only about 4.5% of all waste plastic film is recycled in the United States and plastic film makes up approximately 3.1% of all landfilled municipal solid waste. In view of the above, it is desirable to have a transfer film that can be used a large number of times.

As such, a need exists for a method and apparatus for transfer lamination which provides an ease of manufacture and cost savings currently unavailable with known processes. A need also exists for a transfer lamination process that does not require the disposal and/or recycling of a transfer film after a limited number of laminations. As discussed in detail herein, the present invention addresses these needs.

SUMMARY OF THE INVENTION

It is an object of the present invention to provide a method and apparatus for transfer lamination.

It is an additional object of the present invention to provide a method and apparatus for transfer lamination which provides an ease of manufacture and cost savings currently unavailable with known processes.

It is another object of the present invention to a provide method and apparatus for transfer lamination in which a transfer film need not be discarded or recycled after a single lamination.

It is an additional object of the present invention to provide a method and apparatus for transfer lamination which provides an ease of manufacture and cost savings through the inline coating of a transfer film for reuse while it is in use in a transfer lamination process.

It is another object of the present invention to provide a method and apparatus for transfer lamination in which a transfer film does not need to be discarded or recycled after a single lamination as it is coating for reuse during a transfer lamination process.

It is an object of the present invention to provide a method and apparatus for transfer lamination in which a breakaway layer may be easily applied to a transfer film.

It is yet another object of the present invention to provide a method and apparatus for transfer lamination in which a breakaway layer is easily applied to a transfer film through an inline process in which the film is bonded to a substrate prior to application of the breakaway layer.

It is an additional object of the present invention to provide a method and apparatus for transfer lamination in which a breakaway layer is applied to a transfer film through an inline process in which the film is bonded to a substrate prior to application of the breakaway layer resulting in a breakaway layer superior to that produced through known offline processes.

An embodiment of the inventive method of transfer lamination involves metallizing a first side of a film and then bonding the metallized first side to a substrate. Then a breakaway coating is applied to a second side of the film after it has been bonded to the substrate. The bonded film/substrate is then cured. The film is subsequently stripped away leaving metal from the film deposited on the substrate. The application of the breakaway coating is performed as an inline part of the transfer lamination process.

Another embodiment of the invention involves a method for transfer lamination which includes bonding a metallized first side of a film to a substrate and applying a breakaway coating to a second side of the film after it has been bonded to the substrate. The bonded film and substrate are then cured in a first zone of an oven. The film is then removed from the substrate leaving metal from the film deposited on the substrate. The substrate is then coated to facilitate printing on said metallized substrate and cured again in a second zone of the oven. The application of the breakaway coating is performed as an inline part of the transfer lamination process.

Another embodiment of the invention involves a system for transfer lamination of a substrate. The system includes a bonding station for bonding a metallized first side of a film to a substrate and a first coating station for applying a breakaway coating to a second side of the film after it has been bonded to the substrate. The system further includes a curing station for curing the bonded film and substrate a stripping station for removing the film from the substrate.

These and other objects, features and advantages of the present invention will become apparent in light of the detailed description of the best mode embodiment thereof, as illustrated in the accompanying drawings.

DETAILED DESCRIPTION OF THE PREFERRED EMBODIMENT

Figure 1:
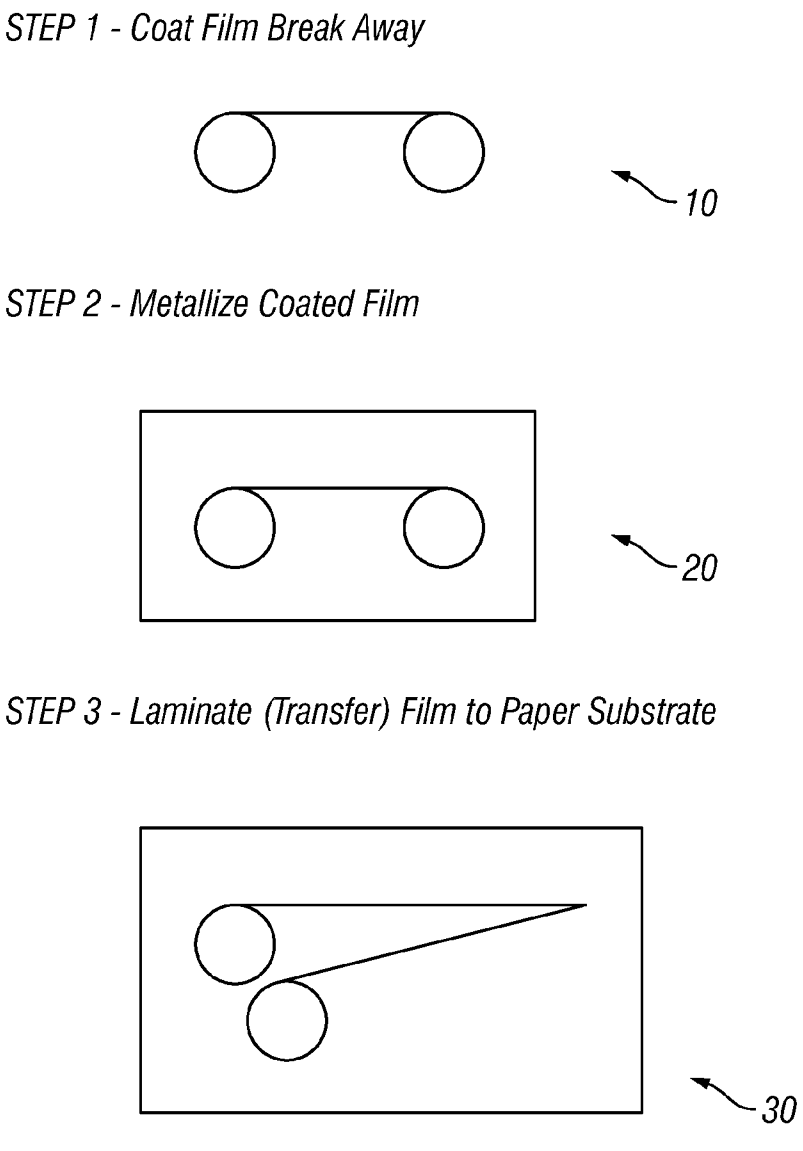
FIG. 1 (Prior Art)
FIG. 1 is a graphical illustration of a prior art transfer lamination process in which a transfer film is first coated and metallized and then used in a lamination process.

Referring to FIG. 1, known processes for transfer lamination involve three general steps. The first of these steps, labeled with reference number 10, is to coat the film used in the lamination. In particular, the film is coated with a breakaway layer that allows it to be removed or stripped from the substrate after the lamination has occurred. This step is performed offline, that is, it is not part of the main transfer lamination process that results in the end product. Moreover, only one side of the film is coated in this initial step.

After a side of the film has been coated with the breakaway layer, typically a polymer such as an acrylate or urethane, the film is metallized. The metallization step is also offline from the transfer lamination process and involves placing the coated film in a relatively large metallizer where metals are vacuum deposited on the coated film.

Once the coated film has been metallized, it is bonded to a substrate in a third step, represented by reference number 30. In this step, the coated and metallized film is placed within a transfer lamination apparatus and the film is bonded via pressurized bonding with an adhesive to the substrate. Once bonded, the film/substrate typically are cured typically in an oven. The film is then stripped away from the substrate when it emerges from the oven leaving the metal and breakaway layer on the substrate. The metallized substrate may then be coated and cured again in the oven resulting in the end product.

As stated, the above-recited steps of coating the film with a breakaway layer, metallizing the coated film and then using the metallized, coated film in a transfer lamination process, are separate from one another. As will be readily appreciated, the greater number of steps in the manufacture of a product, the higher the associated manufacturing costs and degree of manufacturing difficulty.

Figure 2:
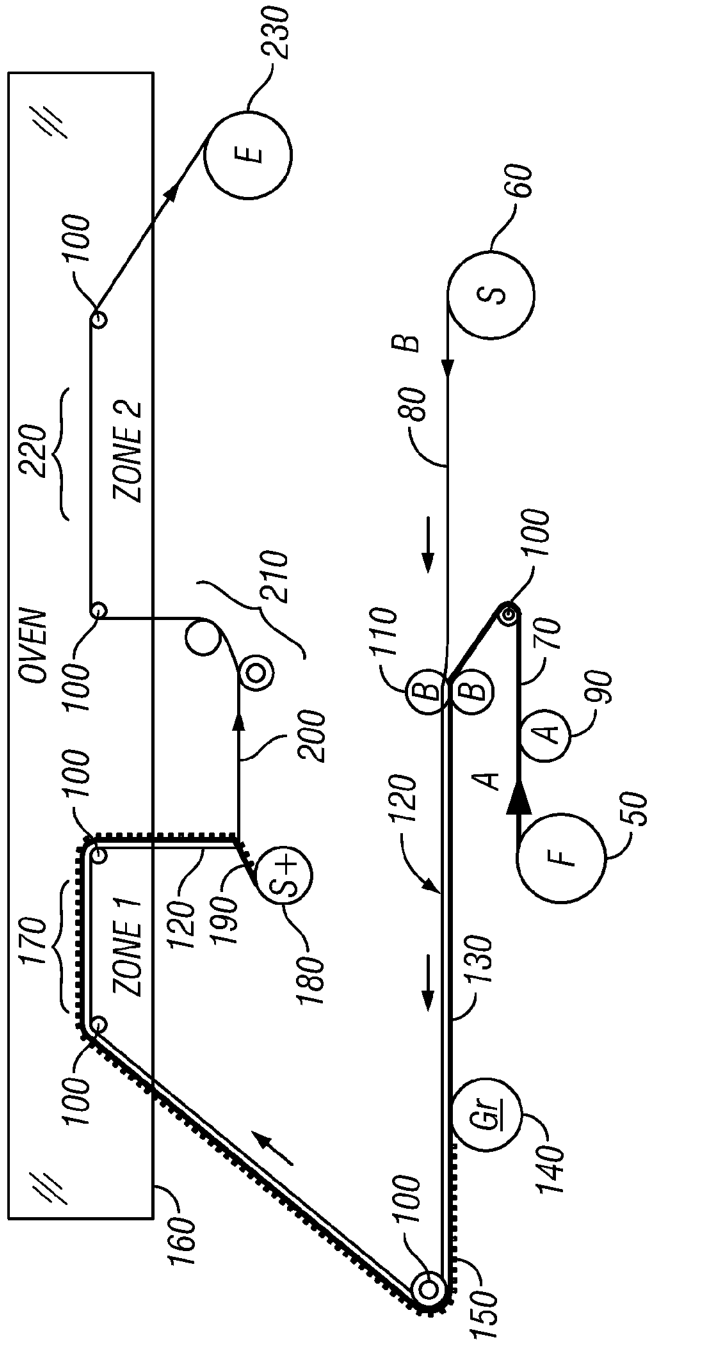
FIG. 2 is a simplified schematic diagram of an apparatus for transfer lamination in accordance with an embodiment of the present invention.

Turning now to FIG. 2, the inventive apparatus 40 combines the steps of applying the breakaway coating to a transfer film and using the coated film in a lamination process to provide an ease of manufacture and cost reduction heretofore unknown in the art. This is accomplished through the depicted apparatus 40 which includes a transfer film roll 50 and a substrate roll 60 which are unwound via motors in directions A and B respectively. The transfer film 70 is unwound from the transfer film roll 50 simultaneously with substrate 80 as it is unwound from the substrate roll 60.

The transfer film 70 has been coated with a breakaway layer on a first side which is to be bonded to the substrate 80.

The film 70 has also been previously metallized in a separate process. For the present discussion, the film is described as being new, i.e., no side has been previously coated with a breakaway layer. Alternatively, however, the breakaway later present on the first side could also be the result of the inventive process, that is, the film may have been previously used and inline coated as described herein.

As the substrate 80 is unwound and travels in direction A, an adhesive/glue is applied by an applicator 90. The adhesive allows the film 70 and substrate 80 to be securely bonded. After the application of the adhesive, the film 70 encounters an idler roller 100, which changes the path of the film and guides it toward a bonding station.

In particular, the film 70 and substrate 80 are bonded through pressure bonding which is accomplished at a bonding station, e.g. rollers 110. Although rollers are depicted, it will be apparent that other means of bonding whether pressurized or not may be employed including the use of a pressurizing chamber instead of rollers.

Once the transfer film 70 has been bonded to the substrate 80, a first intermediate product 120 is formed. This intermediate product 120 includes the transfer film 70 with the substrate 80 bonded to the first side of the film 70. A second opposite side of the transfer film 130 remains uncoated.

As shown, this second, uncoated side 130 is then passed through a gravure coating station 140. At the gravure station 140 a roller running in a coating bath (not shown) effectively deposits a coating onto the uncoated side 130 as it passes between the coating roller and a pressure roller (not shown). The gravure coating station 140 applies a breakaway layer 150 to the uncoated side 130 eliminating the need to coat the side 130 in a separate step prior to reuse in the present lamination process.

The inline coating of the uncoated side 130 of the film 70 is an important aspect of the present invention. By providing a breakaway layer 150 to the transfer film 70 during the lamination process, a normally separate manufacturing step is avoided facilitating the convenient, cost-effective reuse of the film 70. This simplified, streamlined process provides a cost savings and ease of manufacture that is presently unknown in the art.

Moreover, it has been found that the inline coating of intermediate product 120, i.e., the film 70 bonded to the substrate 80 is superior to offline coating. In particular, it is easier to apply a breakaway layer 150 to a film 70 that is supported by a relatively rigid substrate 80 than it is to coat an unbonded flexible film. Applying a breakaway layer to the bonded intermediate product 120 results in a potentially more uniform layer as well due to this enhanced rigidity.

The simplified, cost effective manufacturing process increases the probability that the film 70 will be reused multiple times as the inline application of the breakaway layer is convenient and results in a potentially better, more uniform layer to be metallized.

While the present invention contemplates use of a gravure process, it will be appreciated that other coating methods for the inline application of the breakaway layer may be employed. Such methods may include reverse roll coating and the like as long as they can effectively apply the breakaway layer.

Returning now to FIG. 2, once past the gravure coating station 140, the now breakaway-coated intermediate product 120 encounters an idler roller 100, which directs the product 130 toward the curing station, e.g., an oven 160. The intermediate product 130 enters a first zone 170 of the oven 160 where it is cured at a preselected temperature for a specific time period. The product 120 is then directed toward a stripping station 180 where the now pre-coated transfer film 190 is removed from the substrate leaving a substrate that includes the film's breakaway layer and metal layer bonded to its surface. This second intermediate product 200 is then directed toward a second coating station 210 where it is coated to facilitate printing.

Once this coating has been applied, the second intermediate product 200 is directed toward a second curing station, in this example, a second zone of oven 160 where it is placed to further cure. The result of this second curing process is the end product, which is collected at a collection station, e.g., a roll 230.

Figure 3:
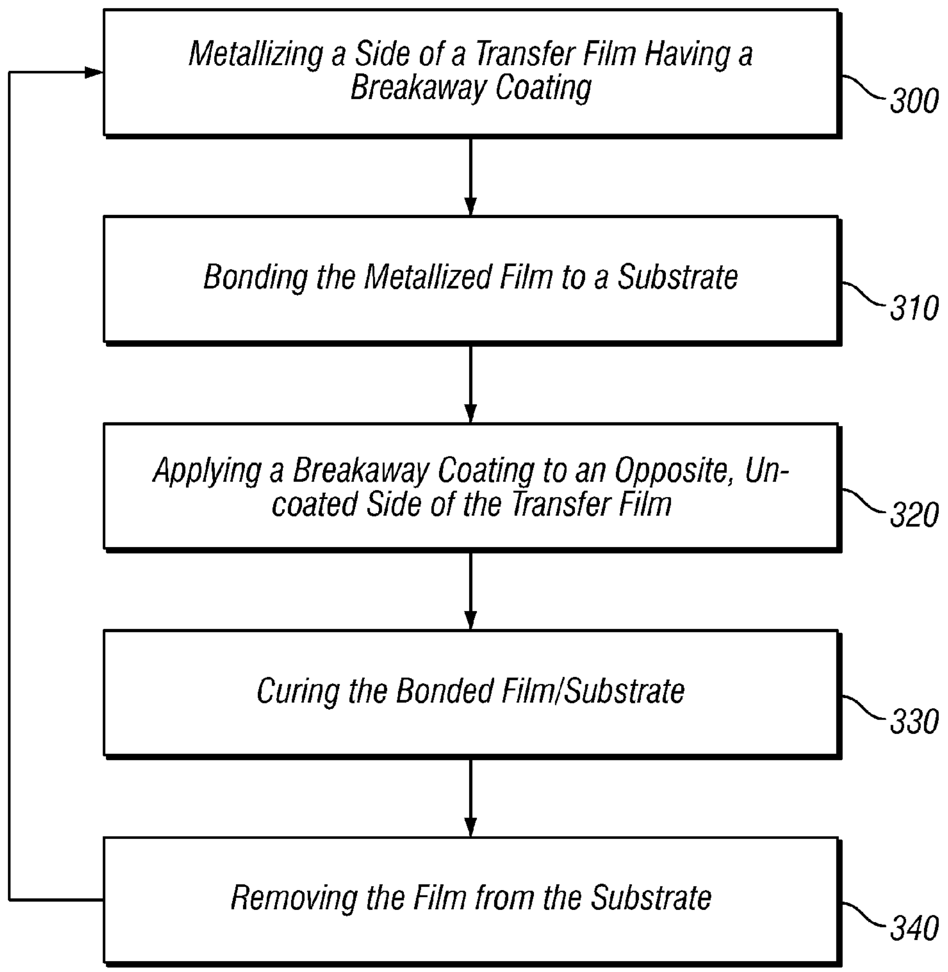
FIG. 3 is a flowchart illustrating a method for transfer lamination in accordance with an embodiment of the present invention.

Turning now to FIG. 3, the inventive process includes several key steps. The first of these steps is to metallize a first side of a transfer film, as indicated by reference number 300. As discussed above, prior to metallization, the film has been coated with a breakaway layer. In the ensuing discussion, tt is contemplated that the film to be metallized has been precoated with the breakaway layer as part of the inventive process. In other words, the film has been previously used and precoated in an earlier transfer lamination process. As will be appreciated, if the film is new and unused a first offline breakaway coating will be necessary.

The metallized film is then bonded to a substrate, generally paper, in a second step 310. Importantly, a breakaway layer is then applied to a second side of the transfer film at step 320 so that, as discussed above, the film may be easily and inexpensively reused.

The bonded film/substrate is then cured at step 330. This process is generally accomplished through the use of a multizone oven.

Once the film/substrate has been cured, the film is removed from the substrate at step 340. At this point, the substrate is coated with the breakaway layer and the metal layer. The film with its pre-coated side, can then be reused beginning with metallization step 300. Optionally, the substrate may be coated for printing in an additional, subsequent step and then cured again in the oven.

Moreover, it may also be possible to reuse the previously used side of the film. That is, one could strip the remaining material off the used side and recoat it with a breakaway layer. Alternatively, one could simply apply a breakaway layer over any residual material on the previously used side.

In sum, the present invention is a method and apparatus for transfer lamination which, through the inline coating of a transfer film, provides an ease of manufacture and cost savings currently unavailable with known processes. The inventive method and apparatus also does not necessitate the disposal and/or recycling of a transfer film after a limited number of uses and provides an easily applied and potentially superior breakaway coating.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A method for transfer lamination, said method comprising the steps of:

bonding a first side of a film having a first breakaway coating and a metallized layer to a substrate;

applying a second breakaway coating to a second side of said film after it has been bonded to said substrate;

curing said bonded film and substrate;

removing said film from said substrate leaving metal from said first side of said film deposited on said substrate; and wherein said application of said breakaway coating is performed as an inline part of a transfer lamination process.

2. The method of claim 1 further comprising the steps of:

coating said substrate after said film has been removed to facilitate printing on said substrate; and curing said coated substrate.

3. The method of claim 1 further comprising the step of:

collecting said film for a subsequent transfer lamination process after it has been removed from said substrate.

4. The method of claim 3 further comprising the step of:

metallizing said second side of said film for a subsequent transfer lamination process.

5. The method of claim 1 wherein said breakaway layer is a polymer.

6. The method of claim 1 wherein said metal on said substrate forms a hologram.

7. The method of claim 1 wherein said breakaway layer is applied at a gravure station that is inline to said transfer lamination process.

8. The method of claim 1 wherein said bonding step includes pressurized bonding of said film to said substrate with an adhesive.

9. The method of claim 1 wherein said bonded film and substrate are cured in an oven having at least one zone.

10. A method for transfer lamination, said method comprising the steps of:

bonding a first side of a film having a first breakaway coating and a metallized layer to a substrate;

applying a second breakaway coating to a second side of said film after it has been bonded to said substrate;

curing said bonded film and substrate in a first zone of an oven;

removing said film from said substrate leaving metal from said first side of said film deposited on said substrate;

coating said metallized substrate after said film has been removed to facilitate printing on said metallized substrate;

curing said coated, metallized substrate in a second zone of said oven; and wherein said application of said breakaway coating is performed as an inline part of said transfer lamination process.

11. The method of claim 10 further comprising the step of:

collecting said film for a subsequent transfer lamination process after it has been removed from said substrate.

12. The method of claim 11 further comprising the step of:

metallizing said second side of said film for a subsequent transfer lamination process.

13. The method of claim 10 wherein said breakaway layer is a polymer.

14. The method of claim 10 wherein said metal on said substrate forms a hologram.

15. The method of claim 10 wherein said breakaway layer is applied at a gravure station that is inline to said transfer lamination process.

16. The method of claim 10 wherein said bonding step includes pressurized bonding of said film to said substrate with an adhesive.

17. A system for transfer lamination of a substrate, said system comprising:

a bonding station for bonding a first side of a film having a first breakaway coating and a metallized layer to a substrate;

a first coating station for applying a second breakaway coating to a second side of said film after it has been bonded to said substrate, said first coating station being located downstream from said bonding station;

a curing station for curing said bonded film and substrate; and a stripping station for removing said film with said second breakaway coating from said substrate.

18. The system of claim 17 further comprising:

a collection station in which said film stripped from said substrate at said stripping station is collected for reuse in a subsequent transfer lamination process.

19. The system of claim 17 wherein said curing station includes an oven having at least one zone.

20. The system of claim 17 further comprising:

a second coating station for applying a coating to said substrate after said film has been stripped away, said coating facilitating printing upon said substrate; and a second curing station for curing said substrate after said coating has been applied to said substrate at said second coating station.

21. A method for transfer lamination, said method comprising the steps of:

bonding a first side of a film having a first breakaway coating and a metallized layer to a substrate;

applying a second breakaway coating to a second side of said film after it has been bonded to said substrate;

curing said bonded film and substrate; and removing said film from said substrate leaving metal from said first side of said film deposited on said substrate.

* * * * *